(12) United States Patent
Popov et al.

(10) Patent No.: US 11,252,976 B2
(45) Date of Patent: Feb. 22, 2022

(54) MULTI-FLAVOR FOOD AND/OR BEVERAGE DISPENSER

(71) Applicant: FBD Partnership, LP, San Antonio, TX (US)

(72) Inventors: Igor V. Popov, San Antonio, TX (US); Clifton Jones, San Antonio, TX (US); Alejandro Ramirez, San Antonio, TX (US); Jeanko J. Lara, San Antonio, TX (US); Matthew Gates, Schertz, TX (US)

(73) Assignee: FBD Partnership, LP, San Antonio, TX (US)

( * ) Notice: Subject to any disclaimer, the term of this patent is extended or adjusted under 35 U.S.C. 154(b) by 0 days.

(21) Appl. No.: 16/163,712

(22) Filed: Oct. 18, 2018

(65) Prior Publication Data

US 2019/0098914 A1  Apr. 4, 2019

Related U.S. Application Data

(63) Continuation of application No. 15/018,185, filed on Feb. 8, 2016.

(Continued)

(51) Int. Cl.
*A23G 9/28* (2006.01)
*B67D 1/00* (2006.01)
(Continued)

(52) U.S. Cl.
CPC ............. *A23G 9/282* (2013.01); *A23G 9/045* (2013.01); *A23G 9/28* (2013.01); *B67D 1/005* (2013.01);
(Continued)

(58) Field of Classification Search
CPC .. B67D 1/0021; B67D 1/0044; B67D 1/0036; B67D 1/005; B67D 1/1202;
(Continued)

(56) References Cited

U.S. PATENT DOCUMENTS

| | | |
|---|---|---|
| 1,846,446 A | 2/1932 | Maynard et al. |
| 2,236,620 A | 4/1941 | Cornelius |

(Continued)

FOREIGN PATENT DOCUMENTS

| | | |
|---|---|---|
| DE | 849 562 | 9/1952 |
| DE | 12 59 913 | 2/1968 |

(Continued)

OTHER PUBLICATIONS

"FCB (Solid State) Post-Mix Dispenser: Two-Flavor/Hot-Gas Defrost" The Cornelius Company, Service Manual, 1989, Anoka, United States.

(Continued)

*Primary Examiner* — Steven J Ganey
(74) *Attorney, Agent, or Firm* — McAughan Deaver PLLC

(57) ABSTRACT

Applicants have created an improved multi-flavor food and/or beverage dispenser including an improved nozzle for injection of flavored liquids into a base liquid. The apparatuses and systems described herein can be used with different food and beverage products including, but not limited to, frozen carbonated beverages, frozen alcoholic and non-alcoholic beverages, frozen yogurts, frozen ice creams and other dispensable food and beverage products.

25 Claims, 8 Drawing Sheets

Related U.S. Application Data

(60) Provisional application No. 62/113,872, filed on Feb. 9, 2015.

(51) Int. Cl.
*B67D 1/12* (2006.01)
*A23G 9/04* (2006.01)

(52) U.S. Cl.
CPC ......... *B67D 1/0021* (2013.01); *B67D 1/0036* (2013.01); *B67D 1/0039* (2013.01); *B67D 1/0044* (2013.01); *B67D 1/0048* (2013.01); *B67D 1/0085* (2013.01); *B67D 1/1204* (2013.01); *B67D 1/1279* (2013.01); *B67D 1/1284* (2013.01); *B67D 2210/0006* (2013.01)

(58) Field of Classification Search
CPC .. B67D 1/1204; B67D 1/1277; B67D 1/1279; B67D 1/1284; B67D 2210/0006; B67D 1/0039; B67D 1/0048; B67D 1/0085; A23G 9/282; A23G 9/28; A23G 9/045
USPC .............. 239/398, 400, 407; 222/129, 129.1, 222/129.3, 129.4, 146.6, 108
See application file for complete search history.

(56) References Cited

U.S. PATENT DOCUMENTS

| | | | |
|---|---|---|---|
| 2,243,930 A * | 6/1941 | Watson .................... | F16K 15/20 152/DIG. 7 |
| 2,276,811 A | 3/1942 | Ward | |
| 2,461,909 A * | 2/1949 | Mcclure ............... | B67D 1/1466 251/120 |
| 2,562,638 A | 7/1951 | Philipp | |
| 2,610,478 A | 9/1952 | Lofstedt | |
| 2,620,108 A * | 12/1952 | Copping .............. | B67D 1/0044 137/898 |
| 2,735,276 A | 2/1956 | Thompson | |
| 2,758,608 A * | 8/1956 | Sutcliffe ................. | F16K 15/20 137/234.5 |
| 2,961,853 A | 11/1960 | Cohrt | |
| 3,030,976 A | 4/1962 | Brown | |
| 3,062,021 A | 11/1962 | Gorse | |
| 3,180,104 A | 4/1965 | Goetz | |
| 3,180,106 A * | 4/1965 | Brandt ..................... | A23G 9/20 261/140.1 |
| 3,279,205 A | 10/1966 | Stoelting | |
| 3,280,459 A | 10/1966 | Walker | |
| 3,295,997 A | 1/1967 | Tomlinson et al. | |
| 3,296,817 A | 1/1967 | Stoelting | |
| 3,298,190 A * | 1/1967 | Harker ................... | A23G 9/045 62/136 |
| 3,410,103 A | 11/1968 | Cornelius | |
| 3,460,713 A * | 8/1969 | Cornelius ........... | B67D 1/0016 222/1 |
| 3,460,717 A * | 8/1969 | Thomas ................. | A23G 9/282 222/129.1 |
| 3,464,200 A | 9/1969 | Phelan | |
| 3,464,220 A | 9/1969 | Phelan | |
| 3,468,137 A | 9/1969 | Welty | |
| 3,497,115 A | 2/1970 | Cornelius | |
| 3,517,524 A | 6/1970 | Fielder | |
| 3,519,910 A | 7/1970 | Pfaff et al. | |
| 3,586,214 A | 6/1971 | Diebel | |
| 3,600,657 A | 8/1971 | Pfaff | |
| 3,608,779 A | 9/1971 | Cornelius | |
| 3,661,303 A | 5/1972 | Prosenbauer | |
| 3,677,272 A | 7/1972 | Shrank | |
| 3,678,752 A | 7/1972 | Dellert | |
| 3,698,203 A | 10/1972 | Stoelting | |
| 3,724,235 A | 4/1973 | Carpigiani | |
| 3,765,576 A * | 10/1973 | Ramsdale ................ | G03D 3/06 222/132 |
| 3,787,145 A | 1/1974 | Keyes et al. | |
| 3,797,268 A | 3/1974 | Garavelli | |
| 3,823,571 A * | 7/1974 | Smith .................... | A23G 9/045 222/129.3 |
| 3,858,498 A | 1/1975 | Swenson | |
| 3,934,427 A * | 1/1976 | Keyes .................... | A23G 9/045 62/342 |
| 3,939,667 A | 2/1976 | Halverson | |
| 3,945,614 A * | 3/1976 | Suzuki .................... | A23G 9/24 366/181.6 |
| 3,969,531 A * | 7/1976 | Cornelius ................ | A23G 9/20 426/319 |
| 3,989,492 A | 11/1976 | Keyes | |
| 3,995,770 A * | 12/1976 | Schwitters ........... | B67D 1/0016 222/56 |
| 4,058,383 A | 11/1977 | Peterson | |
| 4,076,145 A | 2/1978 | Zygiel | |
| 4,083,200 A | 4/1978 | Luxem | |
| 4,093,055 A | 6/1978 | Blackburn et al. | |
| 4,143,793 A | 3/1979 | McMillin et al. | |
| 4,181,242 A | 1/1980 | Zygiel et al. | |
| 4,187,262 A | 2/1980 | Fessler et al. | |
| 4,201,558 A | 5/1980 | Schwitters et al. | |
| 4,213,795 A | 7/1980 | Ernstsson | |
| 4,216,879 A * | 8/1980 | McMillin ............. | B67D 1/0009 137/209 |
| 4,218,014 A * | 8/1980 | Tracy .................... | B05B 7/0408 222/144.5 |
| 4,221,117 A * | 9/1980 | Martineau ................ | A23G 9/20 62/306 |
| 4,266,726 A * | 5/1981 | Brown ................. | B67D 1/0085 222/129.1 |
| 4,270,673 A * | 6/1981 | Rodth .................. | B67D 1/0044 137/606 |
| 4,275,567 A | 6/1981 | Schwitters | |
| 4,383,417 A | 5/1983 | Martineau | |
| 4,392,588 A | 7/1983 | Scalera | |
| 4,393,659 A | 7/1983 | Keyes et al. | |
| 4,444,336 A | 4/1984 | Nielsen | |
| 4,478,357 A * | 10/1984 | Jenkins ................ | B67D 1/0044 222/129.1 |
| 4,509,690 A * | 4/1985 | Austin ..................... | B01F 5/08 222/129.1 |
| 4,580,905 A * | 4/1986 | Schwitters ............. | A23G 9/283 222/129.1 |
| 4,590,970 A | 5/1986 | Mott | |
| 4,625,525 A * | 12/1986 | Bradbury ............... | A23G 9/045 62/330 |
| RE32,360 E | 2/1987 | Martineau | |
| 4,653,281 A | 3/1987 | Van Der Veer | |
| 4,653,928 A | 3/1987 | Bravo | |
| 4,676,401 A * | 6/1987 | Fox ...................... | B67D 1/0047 222/1 |
| 4,680,944 A | 7/1987 | Menzel | |
| 4,703,628 A * | 11/1987 | Togashi ................. | A23G 9/163 222/55 |
| 4,706,473 A * | 11/1987 | Cipelletti ................ | A23G 9/305 62/324.3 |
| 4,708,266 A * | 11/1987 | Rudick ................ | B67D 1/0036 222/105 |
| 4,715,414 A | 12/1987 | Harrison et al. | |
| 4,726,493 A * | 2/1988 | Wallace ............... | B67D 1/0082 137/625.27 |
| 4,736,593 A * | 4/1988 | Williams ................ | A23G 9/163 366/283 |
| 4,736,600 A | 4/1988 | Brown | |
| 4,747,272 A | 5/1988 | Howell et al. | |
| 4,754,609 A | 7/1988 | Black | |
| 4,784,697 A | 11/1988 | Bordini | |
| 4,793,518 A | 12/1988 | Burton | |
| 4,793,520 A * | 12/1988 | Gerber ..................... | A23G 9/28 222/129.1 |
| 4,825,876 A | 5/1989 | Beard | |
| 4,827,965 A * | 5/1989 | Wates .................... | B01F 3/028 137/114 |
| 4,831,839 A * | 5/1989 | Anderson ................ | A23G 9/20 137/512 |

(56) References Cited

U.S. PATENT DOCUMENTS

| | | | |
|---|---|---|---|
| 4,848,381 A * | 7/1989 | Livingston | A23G 7/00 134/57 R |
| 4,854,923 A | 8/1989 | Sexton et al. | |
| 4,869,072 A * | 9/1989 | Sexton | A23G 9/045 62/136 |
| 4,878,760 A | 11/1989 | Newton et al. | |
| 4,928,854 A * | 5/1990 | McCann | B67D 1/0044 222/129.1 |
| 4,972,883 A | 11/1990 | Hassell et al. | |
| 5,016,446 A | 5/1991 | Fiedler | |
| 5,024,066 A | 6/1991 | Goavec | |
| 5,033,651 A * | 7/1991 | Whigham | B67D 1/0051 222/1 |
| 5,048,726 A * | 9/1991 | McCann | B67D 1/0044 222/129.1 |
| 5,056,325 A | 10/1991 | Josten et al. | |
| 5,082,143 A * | 1/1992 | Schramm, Jr. | G07F 13/065 222/129.1 |
| 5,095,710 A | 3/1992 | Black et al. | |
| 5,103,649 A | 4/1992 | Kieffer | |
| 5,121,855 A | 6/1992 | Credle, Jr. | |
| 5,158,506 A * | 10/1992 | Kusano | A23G 9/163 62/136 |
| 5,203,366 A * | 4/1993 | Czeck | B01F 3/088 137/3 |
| 5,203,474 A * | 4/1993 | Haynes | B67D 1/0044 222/129.1 |
| 5,205,129 A * | 4/1993 | Wright | A23G 9/163 62/136 |
| 5,209,076 A | 5/1993 | Kauffman | |
| 5,212,954 A | 5/1993 | Black et al. | |
| 5,226,450 A | 7/1993 | Lambourn | |
| 5,270,013 A | 12/1993 | Decker | |
| 5,285,815 A * | 2/1994 | Henry | B67D 1/0044 137/595 |
| 5,295,807 A | 3/1994 | Willey et al. | |
| 5,388,925 A | 2/1995 | Wilcox | |
| 5,410,888 A | 5/1995 | Kaiser et al. | |
| 5,415,326 A * | 5/1995 | Durham | B67D 1/0044 222/129.1 |
| 5,425,461 A | 6/1995 | Larson | |
| 5,473,909 A | 12/1995 | Kateman et al. | |
| 5,518,666 A | 5/1996 | Plester et al. | |
| 5,537,914 A | 7/1996 | Gibney et al. | |
| 5,549,222 A * | 8/1996 | Schroeder | B67D 1/0044 222/129.1 |
| 5,553,756 A | 9/1996 | Topper | |
| 5,564,602 A * | 10/1996 | Cleland | F25D 17/02 222/146.6 |
| 5,570,822 A | 11/1996 | LeMarbre et al. | |
| 5,601,210 A * | 2/1997 | Kelly | B67D 1/0082 137/625.4 |
| 5,615,559 A | 4/1997 | Kress et al. | |
| 5,632,411 A | 5/1997 | Harty | |
| 5,649,644 A * | 7/1997 | Hashimoto | B67D 1/0044 222/129.1 |
| 5,706,661 A | 1/1998 | Frank | |
| 5,727,773 A * | 3/1998 | Dunnigan | F16K 1/12 251/205 |
| 5,740,844 A | 4/1998 | Miller | |
| 5,743,097 A | 4/1998 | Frank | |
| 5,797,519 A | 8/1998 | Schroeder et al. | |
| 5,799,726 A | 9/1998 | Frank | |
| 5,806,550 A | 9/1998 | Frank | |
| 5,868,065 A * | 2/1999 | Haggerty | A23G 3/0242 366/144 |
| 5,899,077 A | 5/1999 | Wright | |
| 5,967,226 A * | 10/1999 | Choi | A23G 9/281 165/63 |
| 5,974,824 A | 11/1999 | Galockin | |
| 6,095,371 A | 8/2000 | Mooney | |
| 6,126,983 A | 10/2000 | Miller | |
| 6,161,558 A | 12/2000 | Franks | |
| 6,189,745 B1 | 2/2001 | Frank | |
| 6,220,047 B1 | 4/2001 | Vogel et al. | |
| 6,223,948 B1 * | 5/2001 | Davis | B67D 1/0021 222/129.1 |
| 6,253,963 B1 * | 7/2001 | Tachibana | B67D 1/0044 222/129.1 |
| 6,286,549 B1 * | 9/2001 | Carse | B67D 1/0051 137/607 |
| 6,305,269 B1 * | 10/2001 | Stratton | B67D 1/0044 222/459 |
| 6,345,729 B1 * | 2/2002 | Santy, Jr. | B67D 1/0021 222/1 |
| 6,357,632 B1 * | 3/2002 | Salmela | B67D 1/0085 222/334 |
| 6,419,120 B1 | 7/2002 | Bertone | |
| 6,450,369 B1 * | 9/2002 | Heyes | G05D 11/132 222/129.1 |
| 6,490,872 B1 * | 12/2002 | Beck | A23G 9/045 62/303 |
| 6,513,578 B2 | 2/2003 | Frank | |
| 6,536,224 B2 * | 3/2003 | Frank | A23G 9/045 251/253 |
| 6,564,971 B2 | 5/2003 | Heyes | |
| 6,625,339 B2 | 9/2003 | Frank et al. | |
| 6,637,214 B1 * | 10/2003 | Leitzke | A23G 9/163 62/342 |
| 6,679,314 B2 | 1/2004 | Frank | |
| 6,689,410 B2 * | 2/2004 | Gerber | A23G 9/045 222/135 |
| 6,730,348 B2 * | 5/2004 | Miller | A23G 9/045 426/519 |
| 6,745,592 B1 * | 6/2004 | Edrington | A23G 9/045 426/524 |
| 6,871,761 B2 * | 3/2005 | Fox | B67D 1/0021 222/129.1 |
| 6,877,635 B2 * | 4/2005 | Stratton | A47J 31/41 222/1 |
| 6,945,157 B2 * | 9/2005 | Brown | A23G 9/04 222/129.1 |
| 7,159,743 B2 * | 1/2007 | Brandt | B67D 1/0043 222/129.1 |
| 7,172,658 B2 * | 2/2007 | Field | A47L 11/03 134/21 |
| 7,383,966 B2 * | 6/2008 | Ziesel | B67D 1/0051 222/1 |
| 7,445,133 B2 * | 11/2008 | Ludovissie | B67D 1/0021 222/129.1 |
| 7,559,346 B2 * | 7/2009 | Herrick | A23C 9/133 141/102 |
| 7,562,793 B2 | 7/2009 | Ufheil | |
| 7,578,415 B2 * | 8/2009 | Ziesel | B67D 1/0051 222/129.1 |
| 7,717,297 B2 * | 5/2010 | Kadyk | B01F 3/0861 222/129.1 |
| 7,789,273 B2 * | 9/2010 | Kadyk | B01F 3/0861 222/129.1 |
| 7,828,175 B2 * | 11/2010 | Bethuy | B67D 1/0021 222/129.1 |
| 7,878,370 B2 * | 2/2011 | Sevcik | B67D 1/0021 222/1 |
| 8,079,230 B2 | 12/2011 | Frank | |
| 8,091,737 B2 * | 1/2012 | Smeller | B67D 1/0044 222/1 |
| 8,113,386 B2 | 2/2012 | Herrick et al. | |
| 8,322,570 B2 * | 12/2012 | Beavis | A47J 31/36 222/52 |
| 8,528,786 B2 | 9/2013 | Gates | |
| 8,631,974 B2 * | 1/2014 | Piatnik | B67D 1/0051 222/129.1 |
| 8,651,333 B2 | 2/2014 | Metropulos et al. | |
| 8,701,435 B2 | 4/2014 | Gist | |
| 8,701,939 B2 | 4/2014 | Frank | |
| 8,960,500 B2 | 2/2015 | Van Opstal | |
| 9,173,521 B2 | 11/2015 | Gates | |
| 9,388,033 B2 | 7/2016 | Gates | |
| 9,457,386 B2 | 10/2016 | Gates | |
| 9,556,995 B2 * | 1/2017 | Selwyn | F16L 55/053 |

(56) References Cited

U.S. PATENT DOCUMENTS

| | | | |
|---|---|---|---|
| 9,714,162 B2 | 7/2017 | Hecht | |
| 9,840,407 B2* | 12/2017 | DiFatta | B67D 1/0888 |
| 10,034,488 B2 | 7/2018 | Graczyk | |
| 10,321,699 B2 | 6/2019 | Gates | |
| 10,327,455 B2 | 6/2019 | Gates | |
| 2001/0035016 A1* | 11/2001 | Weber | A23G 9/045 |
| | | | 62/210 |
| 2002/0033021 A1 | 3/2002 | Frank | |
| 2002/0043071 A1 | 4/2002 | Frank | |
| 2002/0074348 A1* | 6/2002 | Heyes | B01F 5/0471 |
| | | | 222/145.6 |
| 2003/0126871 A1 | 7/2003 | Frank | |
| 2003/0161923 A1 | 8/2003 | Holland et al. | |
| 2005/0051577 A1 | 3/2005 | Loeb et al. | |
| 2006/0186137 A1 | 8/2006 | Till | |
| 2006/0277932 A1 | 12/2006 | Till | |
| 2007/0017234 A1 | 1/2007 | Moulder | |
| 2007/0062212 A1 | 3/2007 | Frank | |
| 2007/0125104 A1 | 6/2007 | Ehlers | |
| 2007/0205221 A1* | 9/2007 | Carpenter | B67D 1/0051 |
| | | | 222/129.4 |
| 2007/0267441 A1* | 11/2007 | van Opstal | B67D 1/0025 |
| | | | 222/129.4 |
| 2008/0006050 A1 | 1/2008 | Gist | |
| 2008/0029541 A1* | 2/2008 | Wallace | B01F 13/1055 |
| | | | 222/129.3 |
| 2008/0041876 A1* | 2/2008 | Frank | A23G 9/045 |
| | | | 222/1 |
| 2008/0073376 A1 | 3/2008 | Gist | |
| 2008/0073609 A1 | 3/2008 | Akkermann | |
| 2008/0202130 A1 | 8/2008 | Kadyk | |
| 2008/0203113 A1 | 8/2008 | Groh | |
| 2008/0254180 A1 | 10/2008 | Windhab | |
| 2008/0289357 A1 | 11/2008 | Skobel | |
| 2008/0302824 A1 | 12/2008 | Blomme | |
| 2008/0314918 A1* | 12/2008 | Nuriely | G07F 11/62 |
| | | | 221/1 |
| 2009/0000315 A1 | 1/2009 | Billman | |
| 2009/0014464 A1* | 1/2009 | Adbelmoteleb | B08B 9/032 |
| | | | 222/1 |
| 2009/0069932 A1* | 3/2009 | Rudick | B67D 1/0888 |
| | | | 700/239 |
| 2009/0084817 A1* | 4/2009 | Schroeder | B67D 1/0044 |
| | | | 222/144.5 |
| 2009/0145926 A1* | 6/2009 | Klopfenstein | B67D 1/0031 |
| | | | 222/129.4 |
| 2009/0230149 A1* | 9/2009 | Smeller | B67D 1/0024 |
| | | | 222/145.5 |
| 2009/0272274 A1* | 11/2009 | De Graaff | A47J 31/41 |
| | | | 99/279 |
| 2009/0292395 A1 | 11/2009 | DiFatta | |
| 2010/0044395 A1 | 2/2010 | Webb | |
| 2010/0145522 A1* | 6/2010 | Claesson | B67D 1/0021 |
| | | | 700/265 |
| 2010/0147154 A1* | 6/2010 | De Graaff | A47J 31/405 |
| | | | 99/279 |
| 2010/0147875 A1* | 6/2010 | Santos | A23G 9/045 |
| | | | 222/1 |
| 2010/0180630 A1 | 7/2010 | Ogawa | |
| 2010/0224649 A1* | 9/2010 | Hoover | B67D 1/0034 |
| | | | 222/1 |
| 2010/0293965 A1 | 11/2010 | Frank | |
| 2010/0319389 A1 | 12/2010 | Yang et al. | |
| 2011/0006445 A1* | 1/2011 | Romanyszyn | B67D 1/0021 |
| | | | 261/26 |
| 2011/0042414 A1 | 2/2011 | Tachibana | |
| 2011/0049190 A1 | 3/2011 | Sevcik | |
| 2011/0192423 A1 | 8/2011 | Boussemart | |
| 2011/0305807 A1* | 12/2011 | Koeling | A47J 31/407 |
| | | | 426/431 |
| 2012/0055954 A1* | 3/2012 | Hecht | A47J 31/52 |
| | | | 222/129.1 |
| 2012/0152981 A1* | 6/2012 | Metropulos | B67D 1/0044 |
| | | | 222/129.1 |
| 2012/0181287 A1 | 7/2012 | Holbeche | |
| 2012/0186202 A1 | 7/2012 | Pandurangan | |
| 2013/0140328 A1 | 6/2013 | Gates | |
| 2013/0180594 A1 | 7/2013 | Schneider | |
| 2013/0200103 A1* | 8/2013 | Gates | B67D 7/74 |
| | | | 222/145.5 |
| 2014/0061345 A1 | 3/2014 | Machovina | |
| 2014/0209635 A1 | 7/2014 | Gates | |
| 2014/0263414 A1* | 9/2014 | San Miguel | A23G 9/045 |
| | | | 222/1 |
| 2014/0305967 A1* | 10/2014 | Hecht | B67D 1/0052 |
| | | | 222/129.1 |
| 2014/0361041 A1* | 12/2014 | Hawken | B67D 1/0085 |
| | | | 222/129.1 |
| 2014/0372233 A1* | 12/2014 | Knecht | G06Q 20/20 |
| | | | 705/15 |
| 2015/0017297 A1* | 1/2015 | Vastardis | A47J 31/002 |
| | | | 426/429 |
| 2015/0056096 A1* | 2/2015 | Hoover | B67D 1/0044 |
| | | | 422/24 |
| 2016/0009540 A1* | 1/2016 | Hecht | B67D 1/0044 |
| | | | 222/460 |
| 2016/0229675 A1* | 8/2016 | Popov | B67D 1/0021 |
| 2016/0245564 A1 | 8/2016 | Frank et al. | |
| 2016/0245573 A1 | 8/2016 | Frank | |
| 2017/0027185 A1 | 2/2017 | Acosta | |
| 2017/0027188 A1 | 2/2017 | Raybin | |
| 2017/0030467 A1 | 2/2017 | Versteeg | |
| 2017/0064977 A1 | 3/2017 | Bischel | |
| 2017/0225936 A1* | 8/2017 | Jersey | B67D 1/0041 |
| 2018/0103656 A1 | 4/2018 | Acosta | |
| 2018/0106515 A1 | 4/2018 | Cobabe | |
| 2018/0117606 A1* | 5/2018 | Bertness | B01F 13/1055 |

FOREIGN PATENT DOCUMENTS

| | | |
|---|---|---|
| EP | 0250245 | 12/1987 |
| EP | 0 382 275 | 8/1990 |
| EP | 0 596 221 | 5/1994 |
| EP | 0 598 223 | 5/1994 |
| EP | 1 035 030 | 9/2000 |
| FR | 2 600 978 | 1/1988 |
| GB | 2 181 068 | 4/1987 |
| JP | 59-098653 | 6/1984 |
| JP | 11-235154 | 8/1999 |
| JP | 11-253107 | 9/1999 |
| JP | 2000-224959 | 8/2000 |
| WO | 9321102 | 10/1993 |
| WO | 03055326 | 7/2003 |

OTHER PUBLICATIONS

Martinez Navarro, A., International Search Report for Corresponding International Patent Application No. PCT/US97/00986 dated Jun. 2, 1997, European Patent Office.

De Terlizzi, M., International Search Report for Corresponding International Patent Application No. PCT/US2006/033535, dated May 9, 2007, European Patent Office.

De Terlizzi, M., Written Opinion for Corresponding International Patent Application No. PCT/US2006/033535, dated May 9, 2007, European Patent Office.

* cited by examiner

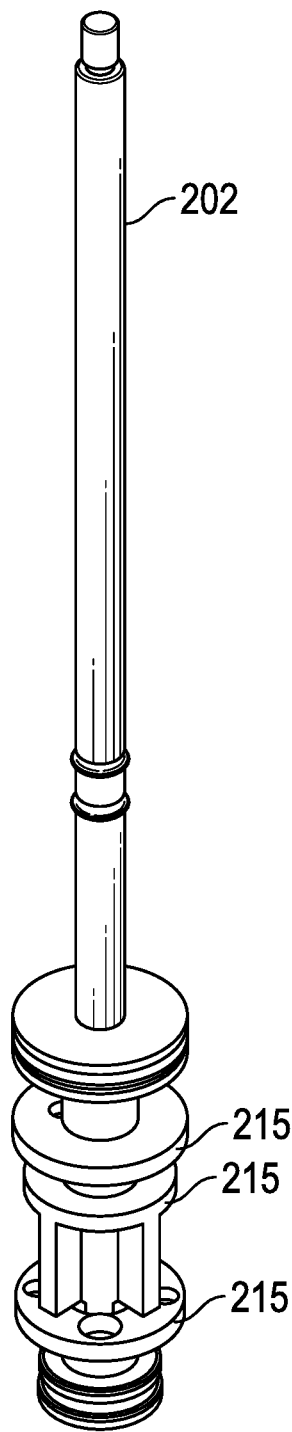
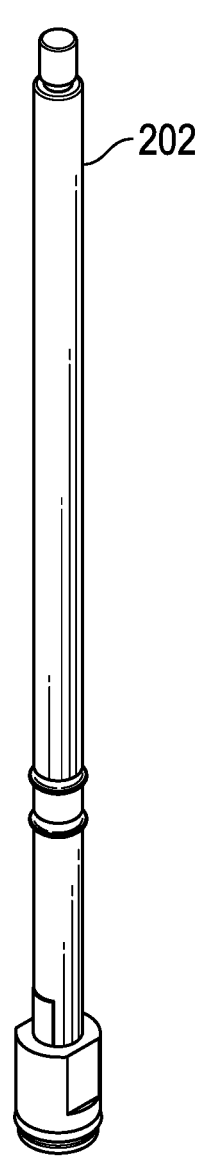
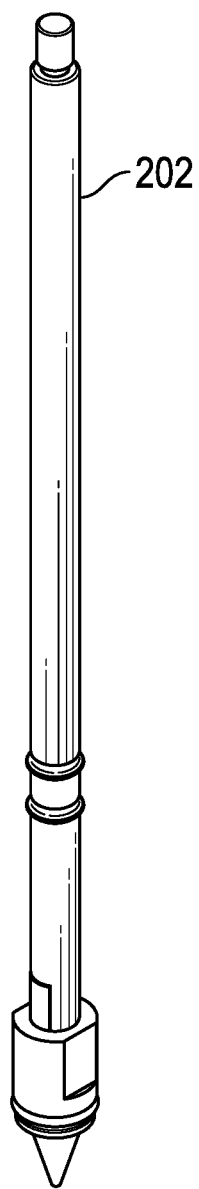
FIG. 5A  FIG. 5B  FIG. 5C

MULTI-FLAVOR FOOD AND/OR BEVERAGE DISPENSER

CROSS REFERENCE TO RELATED APPLICATIONS

The present continuing application claims benefit of and priority to U.S. patent application Ser. No. 15/108,185, filed Feb. 8, 2016, which claims benefit of and priority to U.S. Provisional Patent Application Ser. No. 62/113,872, filed Feb. 9, 2015, the contents of each of which are hereby incorporated by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention. The inventions disclosed and taught herein relate generally to frozen beverage machines; and more specifically relate to an improved multi-flavor food and/or beverage dispenser including a nozzle for injection of flavored liquids into a base liquid. Multi-flavor food and/or beverage dispenser are described in U.S. Pat. Pub. No. US 2008/0041876, the relevant disclosure of which is incorporated herein by reference in its entirety.

DESCRIPTION OF THE RELATED ART

The inventions disclosed and taught herein are directed to a nozzle for injection of flavored liquids into a base liquid.

BRIEF SUMMARY OF THE INVENTION

As one of many possible brief summaries of the nature and substance of the inventions claimed herein a nozzle assembly may comprise a faceplate comprising, a plurality of O-rings, and one or more injection ports; a nozzle that cooperates with the plurality of O-rings, wherein the nozzle comprises, a plurality of circumferential recesses, wherein each recess cooperates with the plurality of O-rings to define a syrup flow channel, and one or more radially spaced additive ports, wherein the one or more radially spaced additive ports comprise a hole that passes from the outside of the nozzle to a center of the nozzle; a valve stem assembly, wherein the valve stem assembly fits within the nozzle; and wherein the one or more injection ports are aligned with the syrup flow channels. The nozzle may comprise an upper cylindrical section, a flat face section below the upper cylindrical section, sloped conical section below the flat face section and wherein the nozzle comprises a hollow center. The valve stem assembly may be capable of movement within the nozzle. The valve stem assembly may be capable of moving upwards to cause a base product to flow through the hollow center of the nozzle. The valve stem assembly may be capable of moving downwards to cause the valve stem assembly to seat against a portion of the nozzle to stop the flow of a base product. The at least one additive check valve connected to the faceplate may be capable of permitting the flow of an additive to the nozzle assembly. The flow control valve may be capable of controlling the dispensing of the additive. The nozzle assembly may further comprise an external manifold that is capable of multiplexing a plurality of additives into one of the one or more injection ports. The nozzle assembly may further comprise a three-way valve that is capable of permitting the flow of a flushing product to flush out the additive. The nozzle may further comprise a flow diffuser located proximate to the points where the additives are injected that is capable of further mixing the additives with the base product.

As another of the many possible brief summaries of the nature and substance of the inventions claimed herein a method of dispensing a product from a machine may comprise activating a valve stem assembly to open a dispense valve of the valve stem assembly to cause a base product to flow through a central opening in a nozzle assembly into a center of a nozzle, wherein the nozzle assembly further comprises a faceplate; injecting a first additive through a first injection port in the faceplate into a first syrup channel, wherein the first syrup channel is defined by a first circumferential recess of the nozzle cooperating with a first pair of O-rings of the faceplate, into a hollow center of a nozzle; injecting a second additive through a second injection port in the faceplate into a second syrup channel, wherein the second syrup channel is defined by a second circumferential recess of the nozzle cooperating with a second pair of O-rings of the faceplate, into a hollow center of a nozzle; and deactivating the valve stem assembly to close the dispense valve to cause the base product to discontinue flow through the central opening of the nozzle assembly. The nozzle may comprise an upper cylindrical section, which comprises the first circumferential recess and second circumferential recess; a flat face section below the upper cylindrical section; and sloped conical section below the flat face section. The method may further comprise injecting a third additive through a third injection port in the faceplate into a third syrup channel, wherein the third syrup channel is defined by a third circumferential recess of the nozzle cooperating with a third pair of O-rings of the faceplate. The injecting a first additive through a first injection port in the faceplate into a first syrup channel may occur for a limited period of time. The injecting a first additive through a first injection port in the faceplate into a first syrup channel may occur prior to the injecting of a second additive through a second injection port in the faceplate into a second syrup channel. The method may further comprise operating a check valve in the additive fluid path to prevent back flow of the additive fluid. The method may further comprise operating a flow control valve to control the dispensing of the additives. The method may further comprise operating a three-way valve to permit the flow of a flushing product to flush out the additive. The method may further comprise operating an integral diffuser of the points where the additives are injected. The method may further comprise multiplexing a plurality of additives through an external manifold into the first injection port.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIGS. 5A-5C illustrates isometric views of three exemplary valve stem assemblies in accordance with certain teachings of the present disclosure.

Figure 1A:
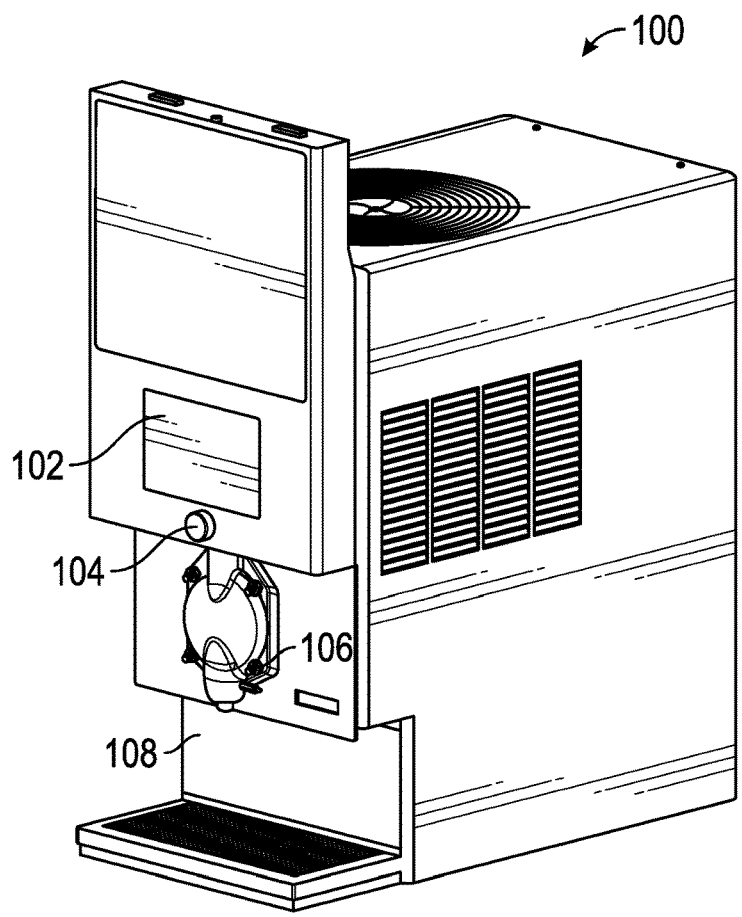
FIG. 1A illustrates an isometric view of an improved multi-flavor food and/or beverage dispenser in accordance with certain teachings of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an improved multi-flavor food and/or beverage dispenser including an improved nozzle for injection of additives into a base liquid.

Figure 1B:
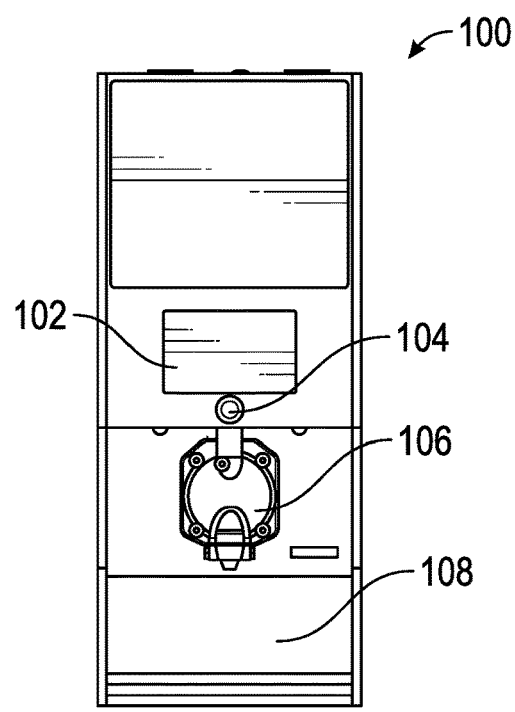
FIG. 1B illustrates a front view of an improved multi-flavor food and/or beverage dispenser in accordance with certain teachings of the present disclosure.

Turning now to the figures, in particular to FIGS. 1A and 1B, an improved multi-flavor food and/or beverage dispenser 100 is illustrated.

For purposes of the present discussion, the food to be dispensed will be described as a frozen non-carbonated beverage, such as a frozen lemonade beverage. It should be understood, however, that the apparatuses and systems described herein can be used with different food and beverage products including, but not limited to, frozen carbonated beverages, frozen alcoholic and non-alcoholic beverages, frozen yogurts, frozen ice creams and other dispensable food and beverage products.

Referring to FIGS. 1A and 1B, the illustrated dispenser may include a touch screen 102, a dispense button 104, a multi-flavor nozzle assembly 106 and a dispense region 108. Touch screen 102 and dispense button 104 are optional features. Dispense button 104 optionally could be a hardware or software dispense button.

In one embodiment, the touch screen 102 provides a graphical user interface in the form of a display that provides one or more screens of options related to the food/beverage item to be dispensed. For example, in one embodiment, the dispenser may be set up to deliver a base lemonade product and, optionally, the base lemonade product combined with one or more flavoring additives, e.g., a raspberry, cherry, blueberry or cotton candy additive. The user can touch one or more icons on the touch screen 102 to select dispensing of the base beverage and (optionally) dispensing of the base beverage in combination with one or more flavoring additives. In the described embodiment, the touch screen 102 communicates with (or is part of) a control system 220, such as an electronic control system, that receives one or more inputs from the touch screen 102 indicating the selected characteristics for the dispensed product. Electronic control systems are described in U.S. Pat. Pub. No. US 2008/0041876, which is incorporated herein by reference in its entirety.

In the embodiment described above, once the user has used the touch screen 102 to make a selection about the characteristics of the product to be dispensed, the user can activate the dispense button 104 to cause the desired food/beverage item to be dispensed by the machine.

In one embodiment, the machine is a frozen beverage machine in which a frozen base beverage product (e.g., a base lemonade product) is formed in a freezing barrel. In this embodiment, dispensing of the selected product is obtained by having the electronic control system 220—in response to the activation of the dispense button 104—activate a main control valve to permit dispensing of the base beverage product. Depending on whether a flavoring additive was selected, the controller 220 can also activate one or more secondary control valves to cause one or more flavoring additives to be dispensed into the flowing base beverage product such that the product actually dispensed from the multi-flavor nozzle assembly 106 is a mixture of the base beverage product and the selected flavoring or flavorings.

When only one flavoring is selected, the electronic controller 220 can cause dispensing of the base flavor for a limited period of time (e.g., one second) and then cause dispensing of the combination of the base flavor and the selected flavoring for as long as the dispense button is activated. Alternatively, the controller 220 could cause the dispenser to immediately begin dispensing the mixture of the base beverage and the flavoring as soon as the dispense button 104 is activated.

In embodiments where the selected flavorings are each associated with a different color (e.g., blue for blueberry, red for cherry, purple for raspberry, pink for cotton candy), dispensing of the base beverage alone for a limited period, followed by a dispensing of the mixture of the flavoring and the base fluid, will allow the operator of the dispenser to visually perceive the addition of the selected flavorings.

When multiple flavorings are selected, the electronic controller 220 can cause the dispensing of the selected product in a variety of ways. In one embodiment, the controller 220 can cause the machine to dispense the base product simultaneously combined with all selected flavorings. This can be done with, or without, an initial flow of the base fluid alone as described above.

In another embodiment, the selection of multiple flavorings can result in a "layered" dispensing where the base product combined with one selected flavoring is dispensed for a first period of time, and the base product combined with the second flavoring is dispensed for a second period of time, followed by a dispensing period with a third selected flavor, and continuing in the same manner if other flavors are selected. In this embodiment, the layering can be accomplished in a variety of ways. In one such way, the layers are relatively "thick" such that there is little mixing of the various selected flavorings. Such layering could result, for example, in a drink having a visible layer of base product, a visible layer of product mixed with a first flavoring, and any other selected flavorings.

In another way, the base product and flavorings can be dispensed in very limited layers (e.g., with each layer associated with a dispense period of 1-2 seconds or less). In such an embodiment, there will be limited visible layers, and the dispensed product will have a more uniform taste and appearance.

In another way, the selection of multiple additives will cause the dispensing of the additives to be injected in the order in which they were selected.

The manner in which the product is layered, or whether it is dispensed with all flavorings at the same time, may be selected using the touch screen 102.

In one embodiment, once the touch screen 102 is used to select the desired drink characteristics, the dispenser will dispense product having those characteristics for as long as the dispense button 104 is depressed. In another embodiment, the touch screen 102 may also be used to select a desired dispensed portion (e.g., by size: small, medium, large or by volume: 8 oz., 12 oz., 16 oz) and activation of the dispense button may result in dispensing of the product for a period sufficient to dispense the selected portion.

Figure 2A:
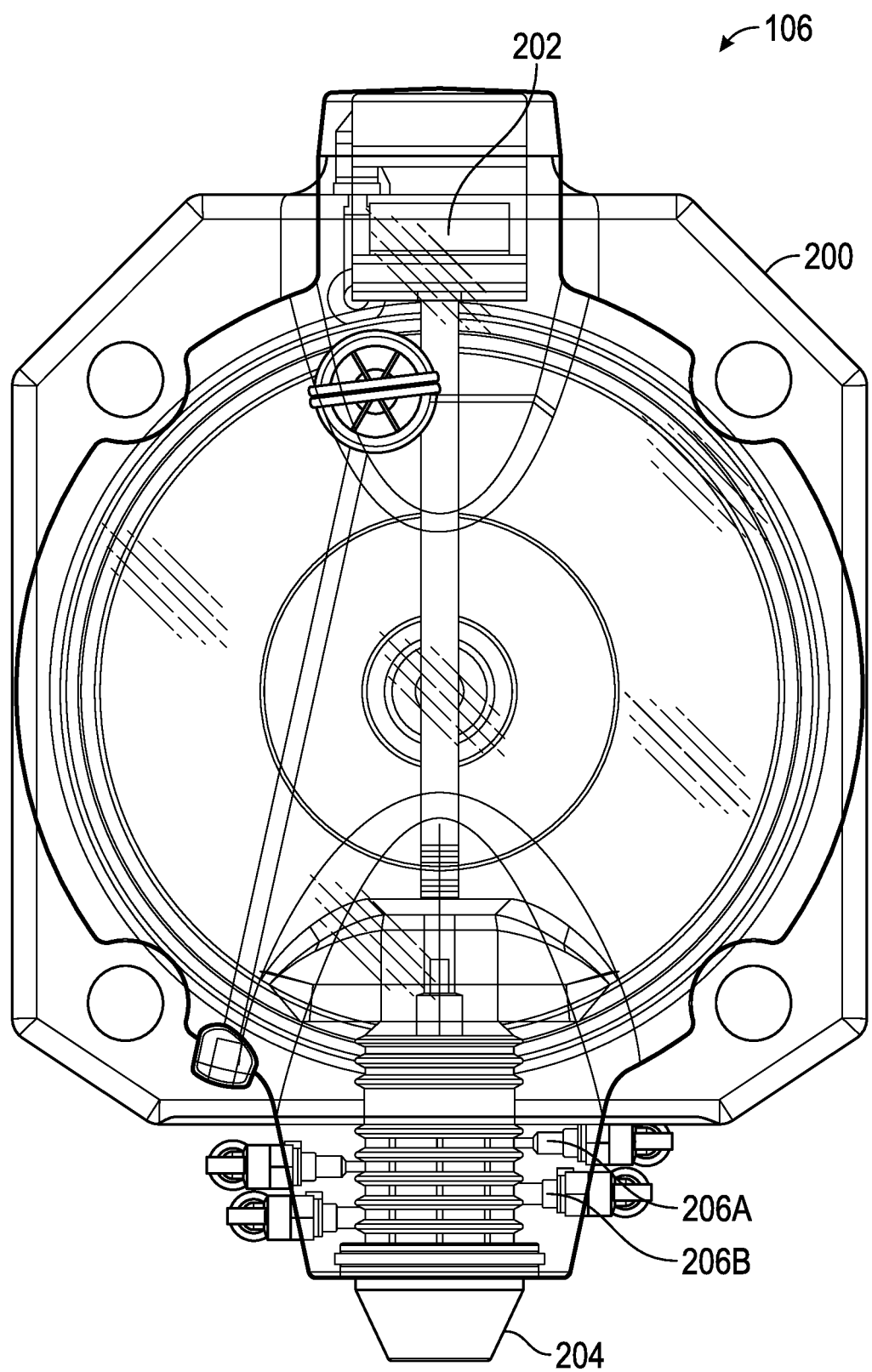
FIGS. 2A-2D illustrate various views of an exemplary multi-flavor dispense nozzle assembly in accordance with certain teachings of the present disclosure.
Figure 2B:
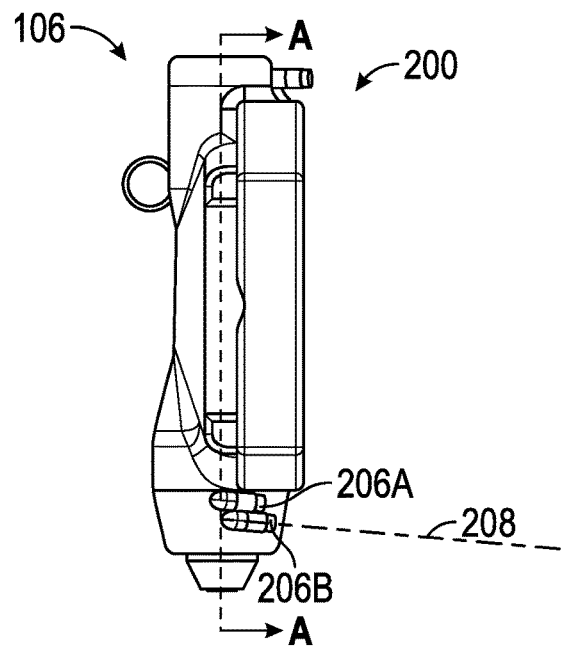
Figure 2C:
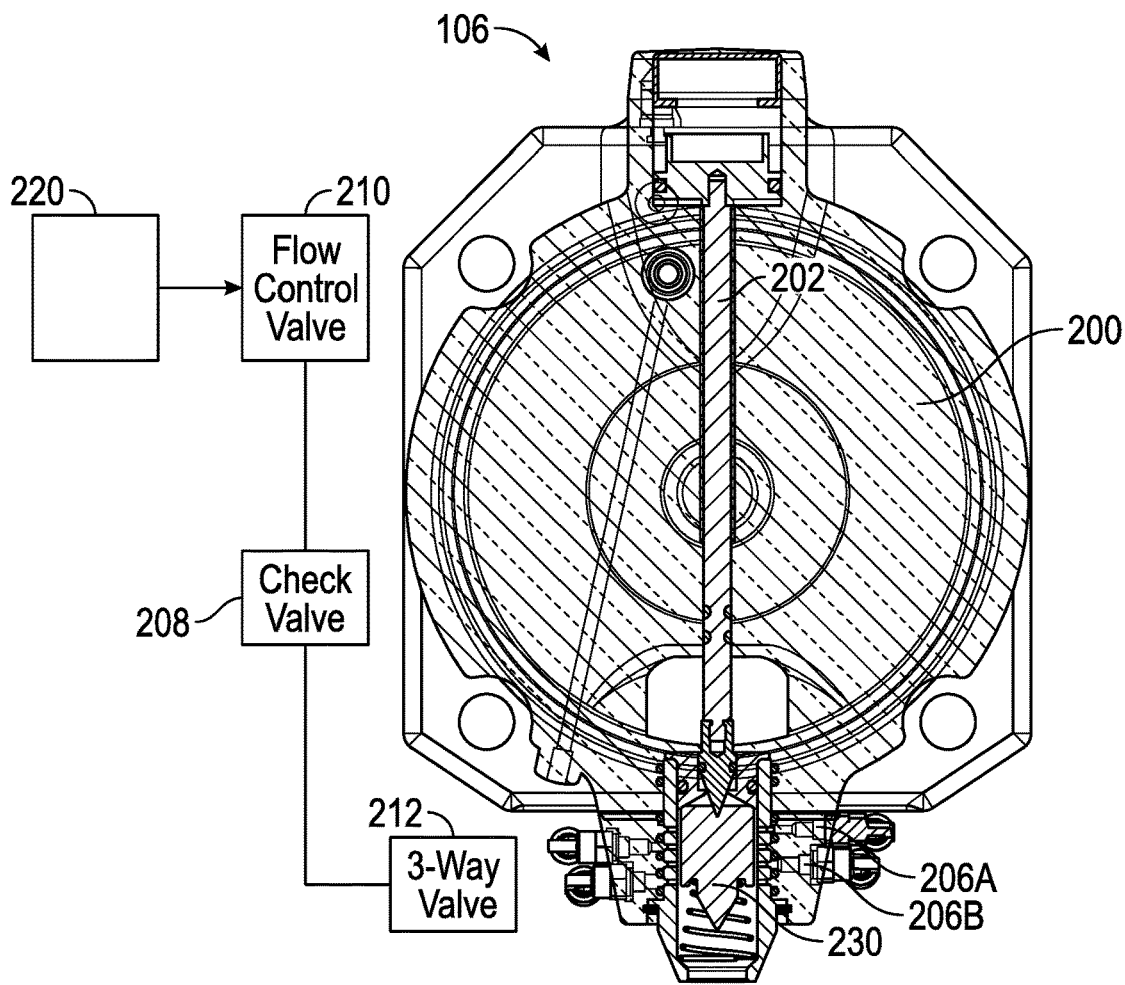
Figure 2D:
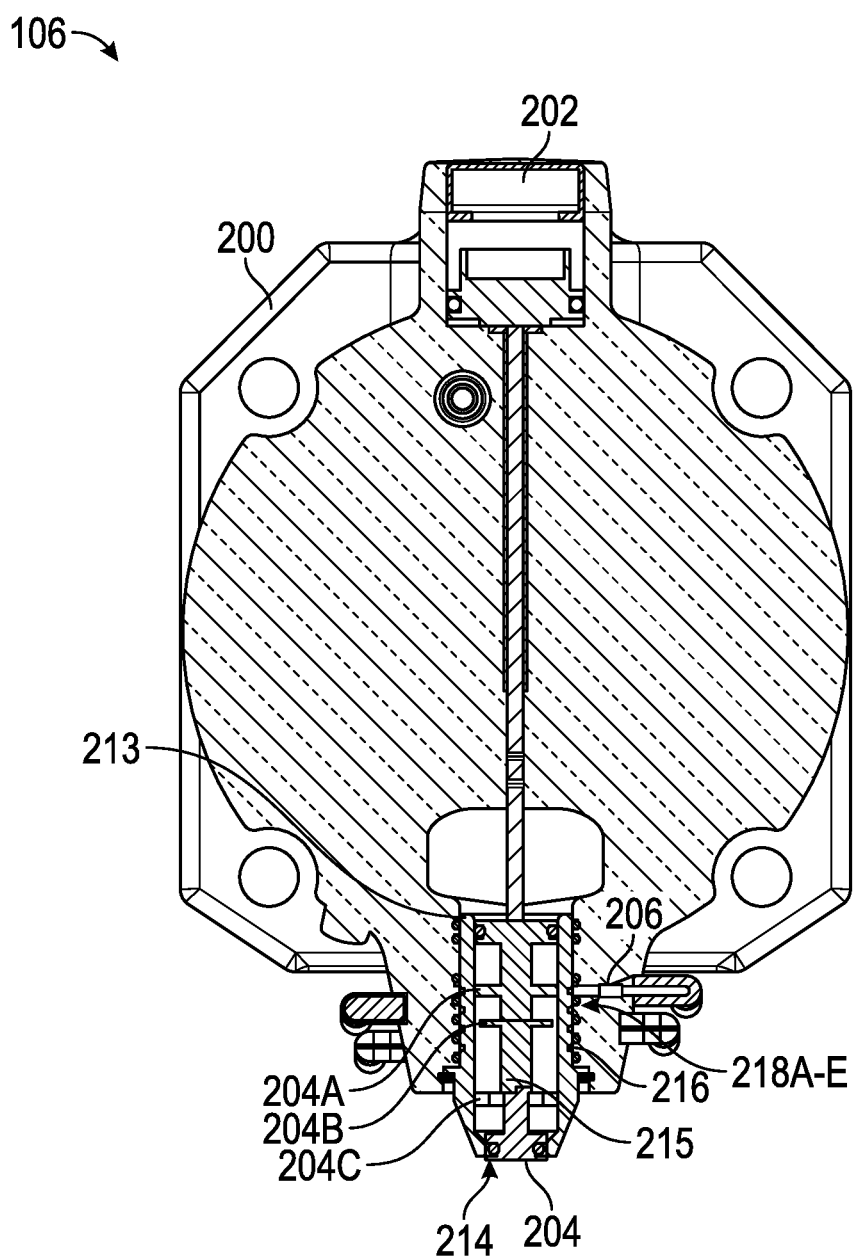

Details of an exemplary multi-flavor dispense nozzle 106 are provided in FIGS. 2A-2D. FIG. 2A provides a front level view of the multi-flavor dispense nozzle 106, FIG. 2B provides a side view of the same and FIGS. 2C and 2D provide cross-sections at various points.

Referring to FIG. 2A, an improved multi-flavor dispense nozzle assembly 106 is illustrated. The improved assembly includes a faceplate 200; a pneumatically actuated valve stem assembly 202; a multi-flavor nozzle 204 that cooperates with O-rings positioned in the faceplate 200 (not numbered in FIG. 2A, but shown, for example, in FIG. 2D) to define a plurality of syrup channels; and additive injection ports 206A and 206B, one or more associated with each syrup channel.

In operation, activation of the dispense button 104 will cause movement of the valve stem assembly 202 upward, which will open the main dispense valve of the valve stem assembly and cause the base beverage product to begin flowing through a central opening in the multi-flavor dispense nozzle 106 and out of the multi-flavor nozzle 204 to the dispense region 108. At the time determined by the controller system 220 a number of additive control valves will activate causing additives to flow from a storage region (tank, bag in a box, etc) through tubing (not shown), through the additive injection port 206 associated with the flavoring, into the syrup channel associated with the flavoring and into the dispensed main beverage.

FIG. 2B shows a side view of the multi-flavor nozzle 106. It illustrates the faceplate 200 and two additive injection ports 206A and 206B. In the illustrated embodiment, each injection port is formed from an opening in the faceplate, a fitting that is inserted into the opening and tubing that runs exterior to the faceplate (not illustrated) coupled to a valve that can be activated to control the flow of an additive through the tube and into the injection port. More or fewer additive injection ports may also be used and implemented.

FIG. 2B also shows the optional use of a check valve 208 that may be included in the fluid path of any additives to prevent back flow of the dispensed product back to the reservoir containing the additive.

FIG. 2C provides still further details of a described exemplary embodiment of the multi-flavor nozzle 106. It shows the faceplate 200, the valve stem assembly 202 and the optional check valve 208. It also illustrates in a schematic fashion a flow control valve 210 that can be used to control the dispensing of the additives, which may be flavoring additives. As described above, in addition to operating the main pneumatic valve associated with the flow of the base product, the electronic controller may control operation of the flow control valves to ensure that the appropriate volume of additive is added when that additive is selected by the user and to ensure that the additive flow is maintained at a consistent flow rate. The use of an electric flow control valve 210 and an electronic controller 220 is significant because the amount of additive that should be added for a given flow of base beverage product will not be constant, but will vary with the nature of the additive. For example not all flavoring additives have equal strength and the proper ratio of additive to base beverage to achieve a desirable drink mix The use of an electronic controller 220 and electric control valves enables the described dispenser to be readily adapted to the dispensing of most any additive product—base beverage mixture.

In one embodiment, the electric flow control valves 210 may be formed from pressure compensating ceramic flow control pistons that have a manually adjustable flow rate in a "bang-bang" control scheme. In this embodiment, when the electronic controller desires to dispense a particular additive, a signal is sent to a solenoid to open the valve associated with that additive and when the controller wishes to cease dispensing the additive it de-energizes the solenoid causing the valve to close.

Alternate embodiments are envisioned where the controller 220 and the flow control valve form a closed-loop control system that reads a pressure differential and calculates a flow rate. In such an embodiment, the error between the desired and actual flow rates would be used to control a high-speed solenoid, which meters a desired amount of syrup into the base flavor flow.

FIG. 2C also illustrates the inclusion of an optional three-way valve 212. Such a three-way valve may be used to permit flow of a neutral flavored product (or other gas or liquid) (e.g., the base product or another product) to "flush" out a syrup channel after each use to prevent flavor mixing and/or to eliminate any color rings associated with the syrup channel that would be visible through the faceplate.

As a final matter, FIG. 2C illustrates the use of flow diffusers 230. These flow diffusers (optional) are located downstream or in the stream of the syrup channels and downstream of the points where the additives are injected into the base product flow. The use of diffusers 230 can help with mixing the additives with the base product as the additives and base product flow through the valve.

In alternate embodiments, a variety of alternative flow diffusers 215 may be integrated directly into the valve stem assembly 202 as shown in FIG. 2D.

The cross-section of FIG. 2D illustrates in greater detail some of the seals and sealing surfaces associated with the exemplary embodiment of the multi-flavor nozzle assembly 106 described above.

Referring to FIG. 2D, a primary seal 213 is illustrated which may prevent flow of any of the additives into the base mixture. The primary seal 213 may also be an upper seal. This seal may be formed using an O-ring, an appropriate gasket or both. A secondary seal 214 shown as part of an alternative embodiment of the valve stem assembly 202 may also be provided at the juncture of the valve stem assembly 202 and the faceplate 200. The secondary seal 214 is optional. A secondary seal 214 may also be a lower seal. The purpose of this seal is to minimize drippage of the additives and/or the base product through the dispensing valve when dispensing is not desired.

FIG. 2D also illustrates the O-rings 218A-E that cooperate with the insertable nozzle 204 to form the syrup channels and the formed syrup channels 216. Only some of the O-rings and syrup channels are numbered in FIG. 2D.

FIGS. 3A, 3B, 4A and 4B illustrate the manner in which the insertable nozzle 204 and O-rings positioned within the faceplate can cooperate to form the described syrup channels 216.

Figure 3A:
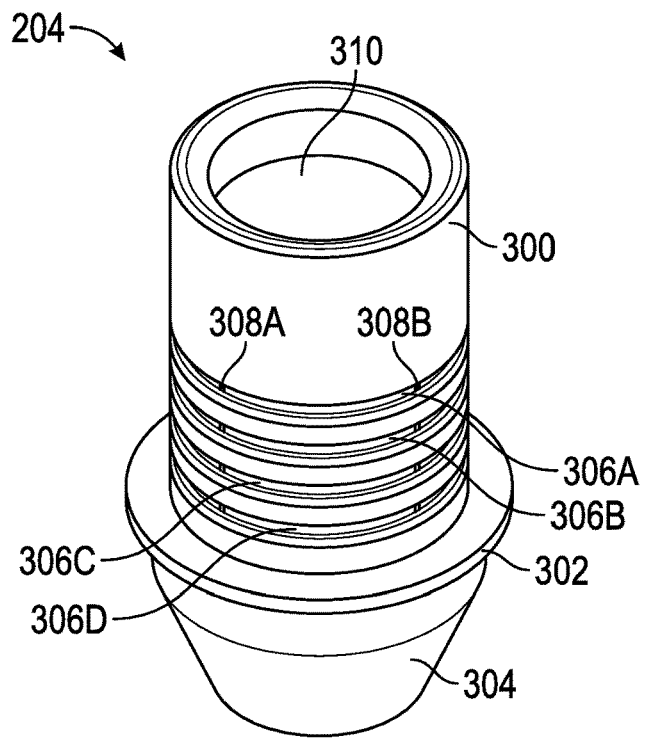
FIG. 3A illustrates an exemplary insertable nozzle of an exemplary multi-flavor dispense nozzle assembly in accordance with certain teachings of the present disclosure.

Referring first to FIG. 3A, an exemplary insertable nozzle 204 is illustrated. As is shown, the nozzle 204 is hollow through the center 310 and defines an upper cylindrical section 300, a flat face section 302 and a sloped conical section 304. Alternatively, sections 300, 302, and 304 may be formed into different shapes than as described in FIG. 3A or 3B. In operation, the valve stem assembly 202 fits within the nozzle 204 such that movement of the valve of valve stem assembly 202 upwards will cause the base product to flow through the interior of the nozzle 204 and movement of the valve of valve stem assembly 202 downward will cause the valve to seat against the nozzle 204 and stop the flow of the base product. The valve stem assembly 202 can seal against the upper and/or lower portion of the nozzle 204 depending on whether or not the primary seal 213 or secondary seal 214 are in place. Other shapes and configurations are envisions for nozzle 204.

Figure 3B:
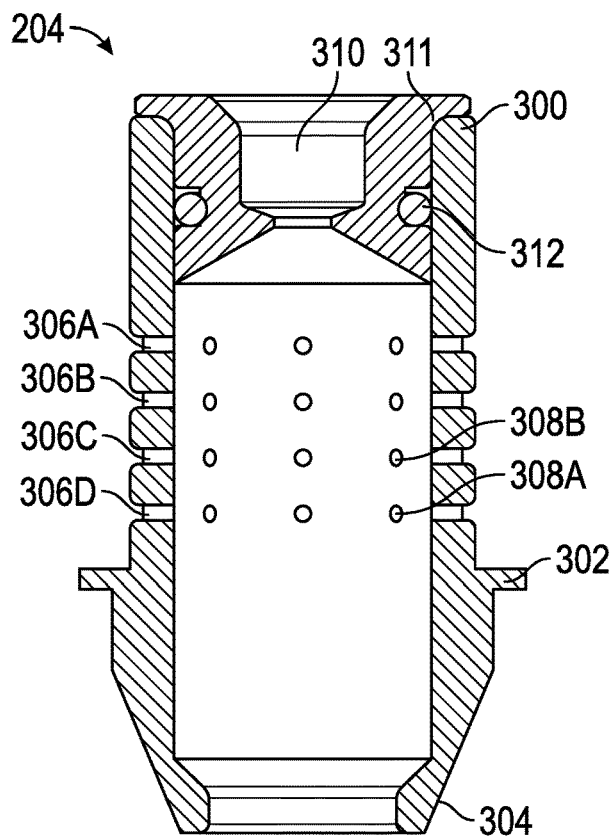
FIG. 3B illustrates a cross-section view of an exemplary insertable nozzle with an exemplary optional flow control insert of an exemplary multi-flavor dispense nozzle assembly in accordance with certain teachings of the present disclosure.

An alternative embodiment of the nozzle 204 illustrated in FIG. 3B illustrates a flow limiting insert 311 with sealing O-ring 312 that can be used to limit the flow of the base liquid and also be used as the sealing surface for the primary seal 213.

The upper cylindrical section 300 further defines circumferential recesses 306A, 306B, 306C and 306D. In the illustrated embodiment, these circumferential recesses define the syrup flow channels.

In the examples of FIG. 3A-3B, each circumferential recess further defines a plurality of radially spaced additive ports, two of which are labeled as 308A and 308B. Each additive port 308A, 308B in the example comprises a hole that passes from the outside of the nozzle 204 to its interior. As such, when an additive is injected into a syrup flow channel (e.g. 306A, 306B, 306C, 306D) with pressure, it will be forced through the additive ports 308A, 308B and into the flow of the base product flowing through the interior of the nozzle 204. In the illustrated example, each circumferential recess defines four additive ports, and the additive ports are equally spaced about the recess.

Figure 4A:
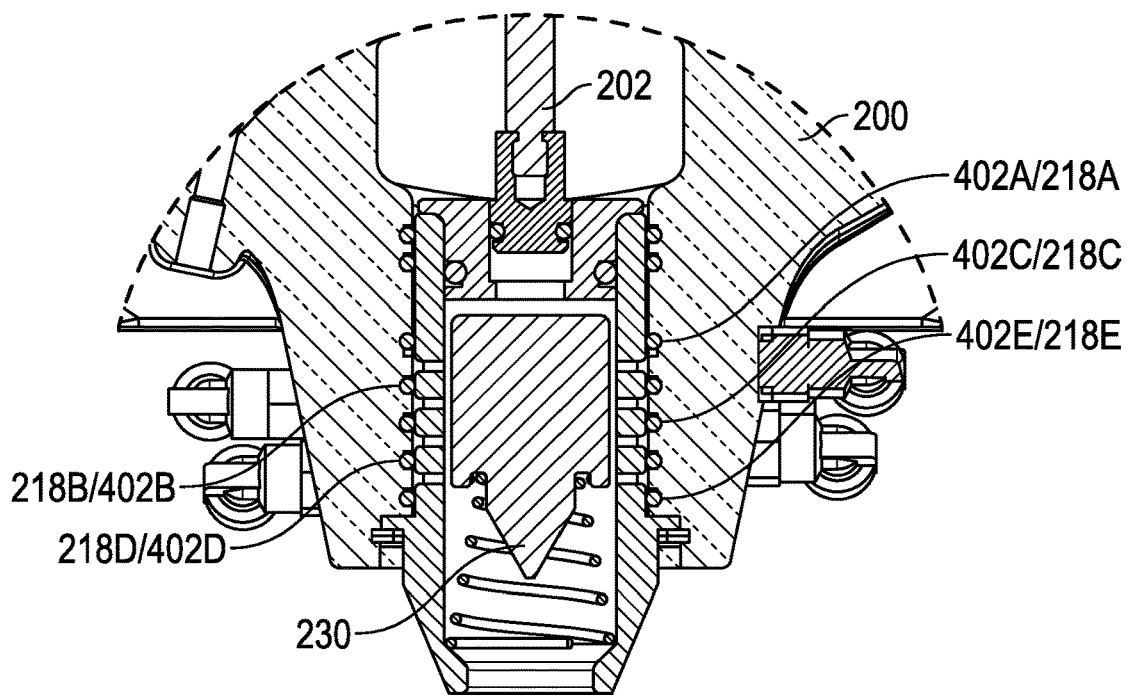
FIGS. 4A-4B illustrate cross-section views of portions of an exemplary faceplate of an exemplary multi-flavor dispense nozzle assembly in accordance with certain teachings of the present disclosure.
Figure 4B:
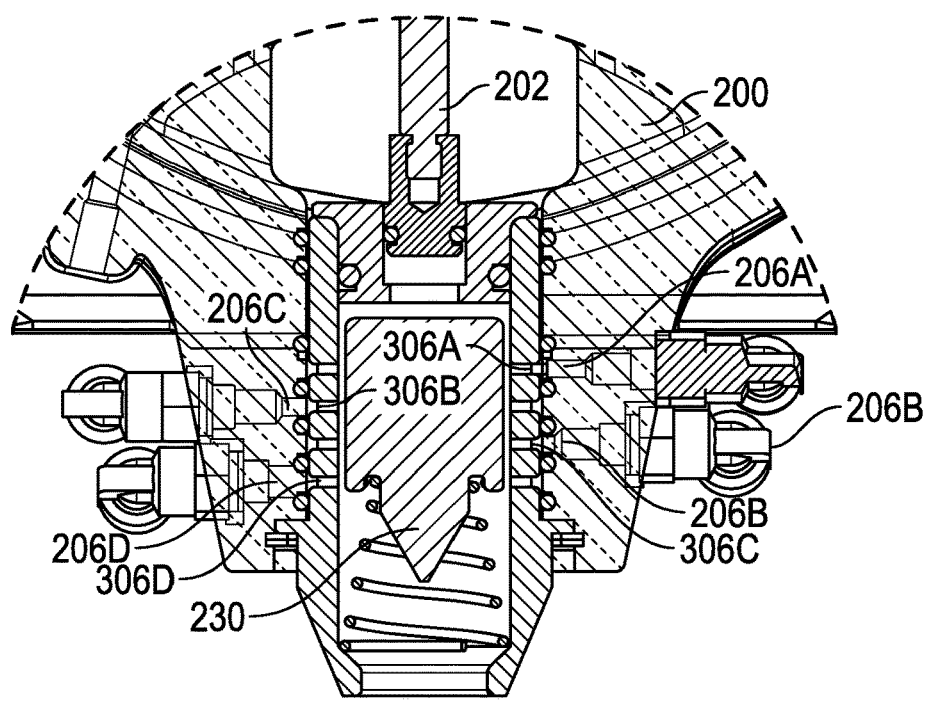

Further details of the faceplate are shown in FIGS. 4A and 4B.

Referring to FIG. 4A the portion of the faceplate 200 that receives the nozzle 204 is illustrated. As illustrated in FIG. 4A, the faceplate defines a plurality of O-ring recesses 402A, 402B, 402C, 402D, and 402E. Referring to FIG. 4B, the faceplate further provides a plurality of injection port 206A, 206B, 206C and 206D. When the disclosed dispenser is fully assembled, O-rings (218A-E) will be inserted into the O-ring openings and the nozzle 204 will be then inserted into the cavity within the faceplate 104 in which the O-rings are positioned. The combination of the O-rings (218A, 218B, 218C, 218D, and 218E) and the circumferential recesses (306A, 306B, 306C, and 306D) in the nozzle will result in the creation of four syrup flow channels. More or fewer than four syrup flow channels may also be used and implemented.

FIGS. 5A, 5B, 5C illustrate isometric views of three exemplary valve stem assemblies 202. FIG. 5A illustrates a valve stem assembly 202 using optional integrated diffusers 215. FIGS. 5B and 5C illustrate alternative embodiments of the valve stem assembly 202, which may be used with the flow-limiting nozzle insert 311.

Figure 6:
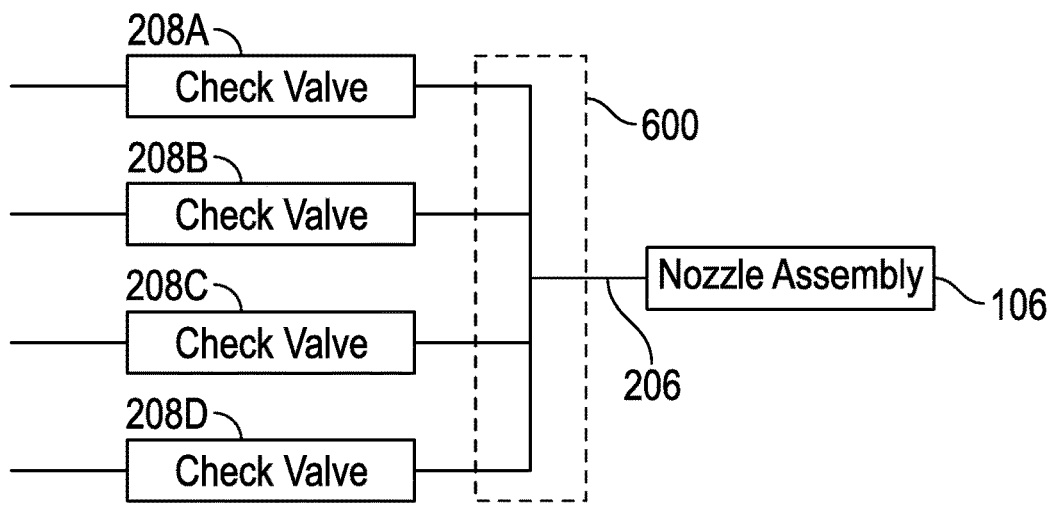
FIG. 6 schematically illustrates an exemplary nozzle assembly with an external additive multiplexing manifold in accordance with certain teachings of the present disclosure

FIG. 6 illustrates schematically an exemplary embodiment of the nozzle assembly 106 where multiple additives may be multiplexed into a single injection port 206 from an external multiplexing manifold 600. Optional additive flow path check valves 208A-D may be integrated into the multiplexing manifold 600 or may be located in the additive flow path before the manifold.

In alternative embodiments of the multiplexing manifold 600, one of the additives may be replaced with a purging or flushing medium to flush out the manifold line to the nozzle assembly 106, and the nozzle assembly 106.

Figure 7:
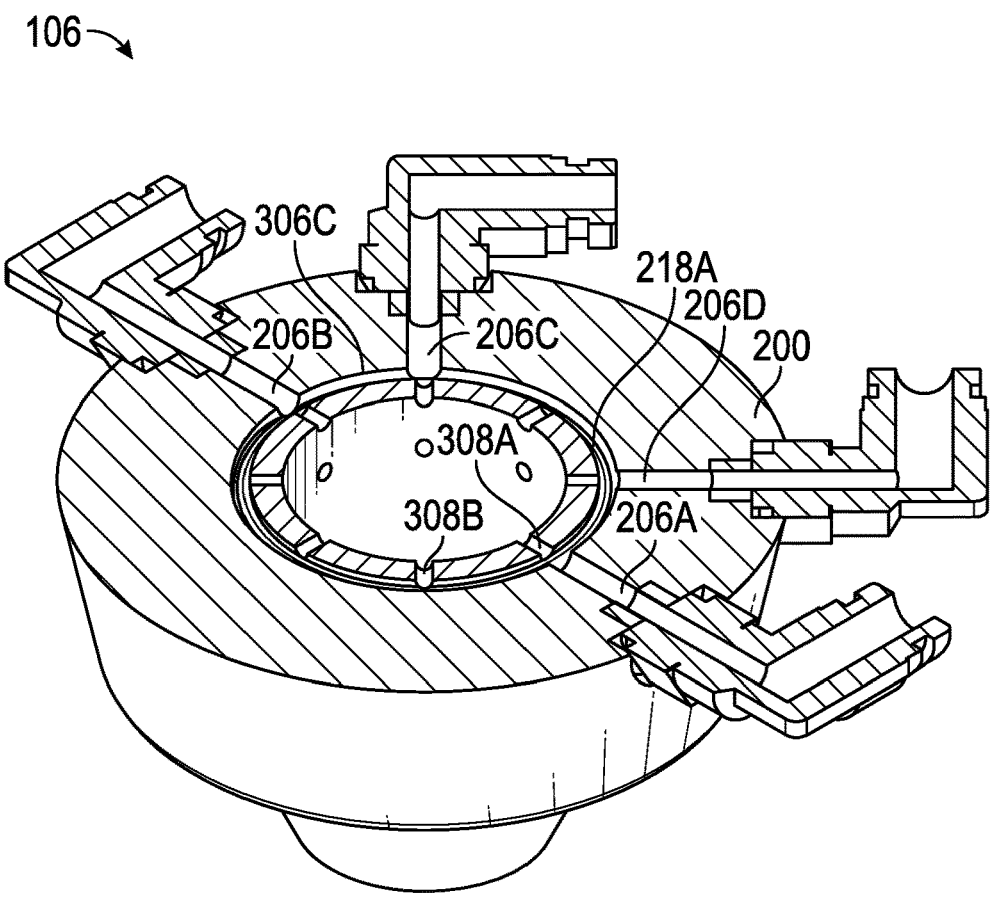
FIG. 7 illustrates a cutaway isometric view of an exemplary nozzle assembly showing an exemplary flow channel with a plurality of injection ports in accordance with certain teachings of the present disclosure.

FIG. 7 illustrates a cutaway isometric view of an alternative embodiment of the nozzle assembly 106 where multiple injection ports (206A, 206B, 206C, 206D) are connected to the same circumferential recess (306C), whereas in FIGS. 4A and 4B the injection ports 206A-D are each connected to its own respective circumferential recess (306A-306D). FIG. 7 illustrates a plurality of radially spaced additive ports, two of which are labeled as 308A and 308B.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A multi-flavor frozen beverage dispenser, comprising:
   a user interface comprising a dispense icon and a plurality of flavor icons each flavor icon associated with at least one additive;
   a base product freezing chamber;
   a dispense valve in fluid communication with the freezing chamber and comprising a dispense valve housing having a central bore and at least one injection port communicating from an exterior of the dispense valve housing into the central bore;
   a nozzle insert positioned within the central bore, and defining a central opening passing there through;
   first and second O-rings positioned between an outer surface of the nozzle insert and the central bore;
   the nozzle insert and the central bore defining at least one additive flow channel circumferentially surrounding the central opening, wherein the at least one additive flow channel is positioned between the first O-ring and the second O-ring and wherein the at least one additive flow channel is aligned with the at least one injection port such that an additive can flow through the at least one injection port into the at least one additive flow channel;
   the nozzle insert further comprising a plurality of ports continuously communicating from the at least one additive flow channel and into the central opening;
   a dispense valve stem positioned within the dispense valve, and movable between at least a first position permitting a flow of base product through the central opening, and a second position where flow of base product through the central opening is blocked;
   a manifold external to the dispense valve and in fluid communication with the at least one injection port, and comprising:
      a plurality of additive inputs, each input configured to receive an at least one additive;
      a purge input configured to receive a purging fluid;
      a check valve associated with each input; and
      an output communicating with the at least one injection port to inject one or more additives or the purging fluid into the at least one injection port;
   a flow diffuser positioned within the central bore and configured to assist mixing of an additive with the base product as the additive and base product flow through the dispense valve; and a controller operable in response to the selection of one or more flavor icons and the dispense icon to move the valve stem to the first position and to cause additives to be dispensed into the base product such that the beverage dispensed by the beverage dispenser is a mixture of the base product and the one or more additives.

2. The multi-flavor beverage dispenser of claim 1, wherein the valve housing is integrally formed in a faceplate.

3. The multi-flavor beverage dispenser of claim 1, further comprising a plurality of additive control valves, input tubing coupling each additive control valve to an additive input, and supply tubing coupling each additive control valve to a source of additive.

4. The multi-flavor beverage dispenser of claim 3, wherein the controller is operable to activate the dispense valve for a first interval when a flavor icon is selected on the user interface and the dispense icon is activated, and to activate one or more additive control valves for a second interval in response to activation of the dispense valve, wherein the first interval is different from the second interval.

5. The multi-flavor beverage dispenser of claim 4, wherein the controller is operable to activate a purge control valve after the one or more additive control valves have been deactivated.

6. The multi-flavor beverage dispenser of claim 1, wherein the first and second O-rings are retained within respective recesses formed in the central bore.

7. The multi-flavor beverage dispenser of claim 1, wherein the manifold is configured to multiplex a plurality of additives into the at least one injection port.

8. A multi-flavor beverage dispenser, comprising:
   a freezing chamber configured to freeze a beverage base product;
   a dispense valve in fluid communication with the freezing chamber and comprising a valve housing defining at least one injection port passing from an exterior of the valve housing into an interior of the valve housing;
   a nozzle insert positioned within the valve housing, and defining a central opening passing there through;
   a first O-ring positioned between the nozzle insert and the valve housing;
   a second O-ring spaced from the first O-ring, and positioned between the nozzle insert and the valve housing;
   the nozzle insert and the valve housing defining at least one a channel circumferentially surrounding the central opening, and positioned between the first and the second O-ring, the at least one channel aligned with the at least one injection port such that a fluid provided to the at least one injection port can flow into the channel;
   the nozzle insert further defining a plurality of ports passing through the nozzle insert in fixed relationship to the at least one channel and configured to permit flow of fluid in the at least one channel through the nozzle insert and into the central opening;
   a valve stem positioned within the valve housing, and movable between at least a first position permitting a flow of base product through the central opening and a second position where the flow of base product through the central opening is blocked;
   a manifold located external to the valve housing and in fluid communication with the at least one injection port, and comprising: a plurality of additive inputs, each additive input configured to receive an additive; a purge input configured to receive a purging fluid; a plurality of check valves, each valve associated with an individual additive input; and an output fluidly coupled to the at least one injection port and configured to communicate one or more additives or purging fluid to the at least one injection port; and a flow diffuser configured to assist with the mixing of additive with base product as the additive and base product flow through the valve housing.

9. The multi-flavor beverage dispenser of claim 8, wherein the valve housing is integrally formed in a faceplate.

10. The multi-flavor beverage dispenser of claim 8, further comprising:

a user interface defining a dispense icon and a plurality of flavor icons, each flavor icon selectable and associated with an additive; and a controller operable to activate the valve stem to move the valve stem to the first position in response to actuation of the dispense icon and operable to cause additives to be dispensed such that the beverage dispensed by the beverage dispenser is a mixture of the base product and the one or more additives.

11. The multi-flavor beverage dispenser of claim 10, wherein the controller is operable to maintain the valve stem assembly in the first position for as long as the dispense icon is selected.

12. The multi-flavor beverage dispenser of claim 11, wherein the controller is operable to dispense the additives at different intervals when more than one flavor icon is selected.

13. The multi-flavor beverage dispenser of claim 8, wherein the first O-ring is retained within a recess formed in the valve housing.

14. A valve for use in a beverage dispenser, the valve comprising:

a valve body comprising a central bore passing through the length of the body and configured to permit the flow of a product through the valve body;

the valve body further defining an additive port passing through the body to permit flow of an additive into the central bore;

an insert positioned within the central bore, the insert defining an insert central bore generally aligned with the body central bore;

the insert and the body defining an additive channel circumferentially surrounding the insert central bore, the additive channel fixedly aligned with the additive port such that additive can flow through the valve body into the additive channel; and the insert comprising a plurality of openings continuously communicating with the additive channel and positioned such that additive can flow through the insert into the insert central bore.

15. The valve of claim 14, further comprising a manifold having a plurality of additive inputs and an output in fluid communication with the additive port in the valve body.

16. The valve of claim 15, wherein the manifold further comprises a purge input in fluid communication with the additive port in the valve body.

17. The valve of claim 14, further comprising a flow control valve.

18. The valve of claim 14, further comprising an additive flow control valve.

19. The valve of claim 14 further comprising an external manifold.

20. The valve of claim 14, wherein the valve body defines an upstream portion for receiving the product and a downstream portion for dispensing an additive, and comprising a diffuser positioned with the valve body downstream of the insert.

21. A multi-flavor beverage dispenser, comprising:

a valve body comprising a central bore and an additive port communicating to the central bore;

a nozzle configured to be positioned within the central bore, and having an outer wall and an inner wall, the inner wall defining a dispensing pathway configured for dispensing a product;

the outer wall of the nozzle defining an additive channel circumferentially disposed about the nozzle;

the nozzle comprising a plurality of ports continuously communicating from the additive channel to the dispensing pathway; and the body and nozzle configured such that when the nozzle is positioned in the central bore, the circumferential channel is sealed to the central bore, such that an uninterruptible flow path is established from the additive port to the circumferential channel and to the ports so that additive can be injected into product being dispensed through the pathway.

22. The dispenser of claim 21, further comprising a pair of O-rings positioned on either side of the circumferential channel to seal the channel to the central bore.

23. The dispenser of claim 22, further comprising a manifold external to the valve body and having a plurality of additive inputs and an additive output, the additive output in fluid communication with the additive port in the valve body.

24. The dispenser of claim 23, wherein one of the additive inputs comprises an input for an additive purge fluid.

25. The dispenser of claim 23, wherein each of the additive inputs is associated with a check valve configured to prevent additive from flowing out an additive input.

* * * * *